(12) United States Patent
Ganetakos et al.

(10) Patent No.: US 8,323,068 B2
(45) Date of Patent: Dec. 4, 2012

(54) VILLAGERS IN A VIRTUAL WORLD WITH UPGRADING VIA CODES

(75) Inventors: Joseph Benjamin Ganetakos, Toronto (CA); Gord Scott McLeod, Georgetown (CA); Frank James Caron, Mississauga (CA); Karl Joseph Borst, Woodbridge (CA)

(73) Assignee: Ganz, Woodbridge, Ontario ( * ) Notice: Subject to any disclaimer, the term of this patent is extended or adjusted under 35 U.S.C. 154(b) by 0 days.

(21) Appl. No.: 13/091,441

(22) Filed: Apr. 21, 2011

(65) Prior Publication Data

US 2011/0263324 A1    Oct. 27, 2011

Related U.S. Application Data

(60) Provisional application No. 61/327,309, filed on Apr. 23, 2010.

(51) Int. Cl.
*A63H 30/00* (2006.01)
(52) U.S. Cl. .............. 446/175; 463/40; 463/42
(58) Field of Classification Search .......... 446/175
See application file for complete search history.

(56) References Cited

U.S. PATENT DOCUMENTS

| | | | |
|---|---|---|---|
| 5,682,469 A | 10/1997 | Linnett et al. | |
| 5,736,982 A | 4/1998 | Suzuki et al. | |
| 5,880,731 A | 3/1999 | Liles et al. | |
| 5,886,697 A | 3/1999 | Naughton et al. | |
| 5,907,831 A | 5/1999 | Lotvin et al. | |
| 6,031,549 A | 2/2000 | Hayes-Roth | |
| 6,173,267 B1 | 1/2001 | Cairns | |
| 6,210,272 B1 | 4/2001 | Brown | |
| 6,267,672 B1 | 7/2001 | Vance | |
| 6,268,872 B1 | 7/2001 | Matsuda et al. | |
| 6,290,566 B1 | 9/2001 | Gabai et al. | |
| 6,388,665 B1 | 5/2002 | Linnett et al. | |
| 6,396,509 B1 | 5/2002 | Cheng | |
| 6,404,438 B1 | 6/2002 | Hatlelid et al. | |
| 6,468,155 B1 | 10/2002 | Zucker et al. | |
| 6,476,830 B1 | 11/2002 | Farmer et al. | |
| 6,493,001 B1 | 12/2002 | Takagi et al. | |
| 6,519,771 B1 | 2/2003 | Zenith | |
| 6,522,333 B1 | 2/2003 | Hatlelid et al. | |
| 6,554,679 B1 | 4/2003 | Shackelford et al. | |
| 6,559,863 B1 | 5/2003 | Megiddo | |
| 6,663,105 B1 | 12/2003 | Sullivan et al. | |
| 6,729,884 B1 | 5/2004 | Kelton et al. | |
| 6,734,885 B1 | 5/2004 | Matsuda | |
| 6,773,325 B1 | 8/2004 | Mawle et al. | |

(Continued)

FOREIGN PATENT DOCUMENTS

JP    2001-522498 A    11/2001

(Continued)

OTHER PUBLICATIONS

Intl Search Report—PCT-CA2009-000271 dated Sep. 7, 2010.

(Continued)

*Primary Examiner* — Masud Ahmed
(74) *Attorney, Agent, or Firm* — Pearne & Gordon LLP (57) ABSTRACT

A user interface for a virtual world includes a circular area forming a display for an item in the virtual world, and controls surrounding only a portion of the display for controlling that item.

14 Claims, 2 Drawing Sheets

U.S. PATENT DOCUMENTS

| | | |
|---|---|---|
| 6,845,486 B2 | 1/2005 | Yamada et al. |
| 6,899,333 B2 | 5/2005 | Weisman |
| 6,910,186 B2 | 6/2005 | Kim |
| 6,918,833 B2 | 7/2005 | Emmerson |
| 6,948,131 B1 | 9/2005 | Neven et al. |
| 6,954,728 B1 | 10/2005 | Kusumoto et al. |
| 7,058,897 B2 | 6/2006 | Matsuda |
| 7,086,005 B1 | 8/2006 | Matsuda |
| 7,155,680 B2 | 12/2006 | Akazawa et al. |
| 7,181,690 B1 | 2/2007 | Leahy et al. |
| 7,396,281 B2 | 7/2008 | Mendelsohn et al. |
| 7,425,169 B2 | 9/2008 | Ganz |
| 7,442,108 B2 | 10/2008 | Ganz |
| 7,465,212 B2 | 12/2008 | Ganz |
| 7,534,157 B2 | 5/2009 | Ganz |
| 7,568,964 B2 | 8/2009 | Ganz |
| 7,587,338 B2 | 9/2009 | Owa |
| 7,604,525 B2 | 10/2009 | Ganz |
| 7,618,303 B2 | 11/2009 | Ganz |
| 7,677,948 B2 | 3/2010 | Ganz |
| 7,789,726 B2 | 9/2010 | Ganz |
| 7,846,004 B2 | 12/2010 | Ganz |
| 7,862,428 B2 | 1/2011 | Borge |
| 2002/0054094 A1 | 5/2002 | Matsuda |
| 2002/0113809 A1 | 8/2002 | Akazawa et al. |
| 2002/0130894 A1 | 9/2002 | Young |
| 2002/0147640 A1 | 10/2002 | Daniele |
| 2002/0169668 A1 | 11/2002 | Bank et al. |
| 2003/0018523 A1 | 1/2003 | Rappaport |
| 2003/0065721 A1 | 4/2003 | Roskind |
| 2004/0030595 A1 | 2/2004 | Park et al. |
| 2004/0043806 A1 | 3/2004 | Kirby |
| 2004/0053690 A1 | 3/2004 | Fogel et al. |
| 2004/0093266 A1 | 5/2004 | Dohring |
| 2004/0242326 A1 | 12/2004 | Fujisawa |
| 2005/0059483 A1 | 3/2005 | Borge |
| 2005/0137015 A1 | 6/2005 | Rogers et al. |
| 2005/0148390 A1* | 7/2005 | Murase et al. .................. 463/40 |
| 2005/0177428 A1 | 8/2005 | Ganz |
| 2005/0250415 A1 | 11/2005 | Barthold |
| 2005/0250416 A1 | 11/2005 | Barthold |
| 2006/0035692 A1 | 2/2006 | Kirby |
| 2006/0184355 A1* | 8/2006 | Ballin et al. ...................... 704/8 |
| 2006/0224971 A1 | 10/2006 | Paulin et al. |
| 2006/0271433 A1 | 11/2006 | Hughes |
| 2007/0024613 A1* | 2/2007 | Jung et al. ...................... 345/419 |
| 2007/0033107 A1 | 2/2007 | Ubale et al. |
| 2007/0050716 A1 | 3/2007 | Leahy et al. |
| 2007/0130001 A1 | 6/2007 | Jung et al. |
| 2007/0143679 A1 | 6/2007 | Resner |
| 2008/0009350 A1 | 1/2008 | Ganz |
| 2008/0009351 A1 | 1/2008 | Ganz |
| 2008/0109313 A1 | 5/2008 | Ganz |
| 2008/0134099 A1 | 6/2008 | Ganz |
| 2008/0163055 A1 | 7/2008 | Ganz |
| 2008/0215973 A1 | 9/2008 | Zalewski et al. |
| 2008/0215974 A1 | 9/2008 | Harrison et al. |
| 2008/0221998 A1 | 9/2008 | Mendelsohn et al. |
| 2008/0280684 A1 | 11/2008 | McBride et al. |
| 2009/0029772 A1 | 1/2009 | Ganz |
| 2009/0053970 A1 | 2/2009 | Borge |
| 2009/0054155 A1 | 2/2009 | Borge |
| 2009/0063282 A1 | 3/2009 | Ganz |
| 2009/0131164 A1 | 5/2009 | Ganz |
| 2009/0204420 A1 | 8/2009 | Ganz |
| 2009/0313084 A1 | 12/2009 | Chugh |
| 2010/0151940 A1 | 6/2010 | Borge |
| 2010/0174593 A1 | 7/2010 | Cao et al. |
| 2011/0092128 A1 | 4/2011 | Ganz |

FOREIGN PATENT DOCUMENTS

| | | |
|---|---|---|
| JP | 2002-055935 A | 2/2002 |
| WO | 99/42917 A2 | 8/1999 |
| WO | 01/69830 A2 | 9/2001 |
| WO | 02/22224 A1 | 3/2002 |
| WO | 2006/128224 A1 | 12/2006 |
| WO | 2008/067668 A1 | 6/2008 |

OTHER PUBLICATIONS

Grace, "Web Site Tycoon's Next Goal: Sixth Grade"; Woonsocket Call, Jun. 19, 2002.

http://web.archive.org.web.20031202190119/www.monopets.com/, Dec. 2, 2003.

Pokemon : Blue and Red—game guide—(2006) http://web.archive.org/web/20060427131258.

Request for Inter Partes Reexamination US 7,604,525 dated Apr. 20, 2010.

The Sims—wikipedia, dated Feb. 6, 2010.

* cited by examiner

VILLAGERS IN A VIRTUAL WORLD WITH UPGRADING VIA CODES

This application claims priority from provisional application No. 61/327,309, filed Apr. 23, 2010, the entire contents of which are herewith incorporated by reference.

BACKGROUND

U.S. Pat. No. 7,425,169, filed Dec. 30, 2004 describes a system of interacting with a virtual representation of a real world product. According to this system, a user can buy a toy or item which is associated with a special code. The toy exists in the real world, and the code forms a key to the virtual world. The user enters the code on a website and enters the virtual world.

The virtual world provides activities and views with which the user can interact. The virtual world, as part of the interaction, provides a virtual replica of the actual toy. Users can carry out various activities on the website using their virtual version of the toy. For example, the user can form a house with rooms, furniture, decorations, toys, clothing, and other objects. The user can also carry out activities to earn cash and purchase virtual items using that cash.

SUMMARY

A system according to one aspect defines a special way of using characters (e.g., referred hereinafter as "villagers") in a virtual world.

According to one aspect, villagers can be "upgraded" by a code.

According to another aspect, moods of the villagers can be changed by different triggers within the game, and the actions of the villagers are changed by the mood triggers.

DETAILED DESCRIPTION

The present application describes additional aspects, actions and activities and additional structure for adding to a website of the type described in U.S. Pat. No. 7,421,569 and as described above. These aspects can be used with other kinds of websites and/or games; for example, any website that allows user interaction.

In one embodiment and in websites such as the Webkinz® and Tail Towns™ websites, users by way of their respective villagers carry out activities to earn virtual cash that is usable on the website. The virtual cash can be used to purchase items that are usable on the website, e.g., virtual food, furniture, virtual clothing or other items.

According to an embodiment, a villager is a virtual representation of a particular figurine which serves as the user's or player's character or representative in a virtual world. When the user buys a figurine, the user gets a code associated with that figurine to register the figurine on the Tail Towns™ site. Registering a figurine unlocks a villager character as a virtual character on the website, as well as several other features associated with that villager.

Each type of figurine corresponds to a different type of villager. Each villager has certain kinds of characteristics and capabilities. Players want to have a variety of villagers because they each enhance the game in different ways, extending gameplay. Players can register as many villagers as they wish, switching between them to play as different villagers at will.

As mentioned above, virtual villagers can be acquired via a secret code included with a physical figurine, or purchased through virtual figurine sales in the eStore. In one embodiment, each code is created using 13 alphanumeric characters, excluding the letters O, L, and I (to prevent visual confusion with numbers). The codes are run through a "bad word" filter to ensure that the codes do not inadvertently spell out something inappropriate.

When players register their code, they get all of the features associated with a villager as well as receiving a virtual version of the villager on the website.

The polystone figurines purchasable in physical stores are referred to as "physical figurines," as opposed to "virtual figurines," which can be purchased in the eStore. To encourage brick-&-mortar store purchases, physical figurines may come with a bonus (virtual) item for the player's account.

To reward early adopters and promote collectability, the first edition of each figurine is distinguished from later editions by having a variant bonus item. This will normally be a "shinier" version of the bonus item.

One example of a villager is a virtual mouse that corresponds directly to the physical figurine. The villager serves as the player's representative in the world when directly controlled, and as an artificial intelligence agent for interaction when the player is controlling a different villager. Players can name their villagers. The names can be up to X characters long, and may include spaces, upper and lower case letters.

The player name will have the following restrictions:
The name cannot exceed the maximum character limit.
The name must have a minimum of three (3) characters.
The name must have two or more words (separated by a single space).
The name must use only Roman alphabetic characters (not numbers/symbols) and spaces.

Spaces are allowed so as to give players more choice; the player will essentially declare a "First Name" and a "Last Name" for her villager, which would be a two-word string ("Tom Tumbler" would be a valid name, for example). The name is nm through a filter to ensure that it is not inappropriate.

To further personalize one's villager, a clothing browser allows players to select clothing for their villagers. Players are able to cycle through the preset initial clothing options easily. Simple "previous" and "next" buttons or arrows for each of the four pre-defined start clothing slots (upper body, lower body, hat, and shoes) are included. The clothing options are dynamically displayed on a Live Villager preview.

The default clothing matches the figurine, but players can modify the shape, texture, color of all clothing pieces. Once the player has set the villager's clothing style, it can be changed at a later date. The changing of clothing may, for example, require the player to pay a virtual fee for the change.

A dynamic, 3D preview of the player's villager is visible at all times throughout the creation process. Players are able to rotate and zoom in on their villager, as well. This interface element will require either buttons for the rotation or mouse-based control. One user interface which may be employed in this regard is described in provisional application No. 61/327,346, filed Apr. 23, 2010, the entire contents of which are herewith incorporated by reference.

A "randomize" button randomly sets all of the aforementioned options and fields (name, eye color, clothing, accessories) to random values. A random name may be selected from a pre-determined list of appropriate names. Then a "submit" button allows the player to confirm her choices.

Finally, all of the above fields are validated/verified upon submission. Text fields are checked for validity, and no firm options are left blank. A system prompt will appear on submit if there are missing fields without actually submitting the form; the missing fields are then highlighted. Required fields are marked as such to avoid player confusion.

When a player adds a new villager to her account, appropriate <Villager> outfit(s) for her villagers are unlocked. Outfits are matched sets of clothing items and accessories that can be equipped. The outfit's components are added to the player's inventory as soon as the code is registered. This is tied to the account/eStore Inventory, and does not take up normal inventory slots. Villager outfits cannot be traded or sold for in-game currency. The villager outfit pieces are treated like eStore items and can be resold via the eStore.

Every villager adds "Economic Output" to the village. This results in a daily boost to the village fund (V.F.) e.g., village bank account. Each villager has the chance of providing an item drop (e.g., maximum of once per day), based on the completion of a daily task.

Codes from physical figurines (as opposed to from virtual figurines) may include a bonus item, appropriate to the figure. This bonus item is treated like an eStore item and can be resold on the eStore.

Satisfaction is a general measure of a villager's contentment. It is an aggregate of all the positive and negative actions that a player can take during a game. Positive actions positively affect a villager's satisfaction, increasing its satisfaction rating, while negative actions negatively affect a villager's satisfaction, decreasing its satisfaction rating.

According to an embodiment, satisfaction is a calculated value derived from the villager's current condition ("happiness" value), longer-term satisfaction (influenced directly by happiness), and is compared to a fixed "baseline contentment" value.

Players do not directly change the villager's long-term satisfaction. Instead, they alter the villager's happiness value, which in turn slowly "drags" the long-term satisfaction level upward or in a positive direction. In this way, keeping a villager happy for a long time will gradually cause the villager to become more and more satisfied.

Villagers may have one of two types of pathing/movement logic.
  Fixed—these villagers stay in a very limited locale, and perform any of a series of scripted, appropriate tasks.
  Roaming—these villagers move around the entire village, occasionally stopping to perform any of a series of scripted, appropriate tasks.

The player interacts with her villagers by selecting the villagers, e.g., right-clicking on them to pull up a contextual menu. Some of the options include:
  Daily Task
  Learn what is needed
  Return when activity is accomplished
  Earn reward
  Dialog
  Access MyVillagers interface
  Give Item to Villager Each villager can be selected to generate a daily task for the player to perform to gain her item drop. Some tasks are procedurally generated, while others are hand-crafted. When a villager has a daily task for the player, the villager will wave to the player, and have speech bubbles calling them over.

Some villagers are associated with a particular building. When a player buys the building, and has the villager, the villager now hangs out/works at the building. For example, the baker would work at the bakery.

Although a villager may roam around his building and throughout the village, when the player's villager enters the associated building, she will always find her villager there, in addition to certain NPCs, such as the Cashier Citizen NPC. If the player sees their villager elsewhere, e.g., wandering around town, the player can interact with the villager there, as well. If another player is watching the villager roam while the player is in her building, it does mean a villager can exist in two places at the same time.

Villagers are the gateway to the world of Tail Towns™ for players, and each villager has a specific set of "Skills" which determine how it fits into the game world. These skills, which range from hands-on talents like "Culinary" to more abstract, intangible strengths like "Family", will determine what rewards players will receive for playing the various games and quests with a given villager.

The relationship between Figurines, Plush, Villagers, and Skills is important to understand; the interplay between the four dictates a great deal of the game's play mechanics. As discussed earlier, "Figurines" are the physical products that players buy in stores. Likewise, "Plush" are the physical plush products that players buy in stores. As with a figurine, each physical "Plush" doll will unlock a digital villager for the player's account within a virtual world. Both of these products can unlock either an "Open" villager or a "Skilled" villager. The players are able to select which skill the plush-based Villager has during the registration process. Aside from this minor difference during registration, open villagers will operate identically to figurine-based villagers.

Open villagers do not have a preset skill type; players are able to choose the type of skill they wish that village to specialize in. Skilled villagers will have a preset skill specialization but with a greater level of skill than an open Villager can possibly have.

Aside from the villager's clothing and initial bonus items, villagers are differentiated by the "Skills" that they have. Skills dictate which play activities and daily directed activities the villager can benefit from. Each "Skilled" villager registered is competent in up to n (e.g., 3) different skills. Competency is rated on a scale from 1 to 10, with 1 being the lowest and 10 being the highest. A villager with absolutely no competency in a given skill would effectively have a 0 rating; these skills would not show up in the villager's skill set.

A Villager's competency in the skills does not necessarily have to be an even split as long as the skill levels total 10. Consider the following examples:
  A "Baker" Villager comes with 10 "Culinary" Skill, meaning it can get special drops from the Culinary mini-game and undertake Culinary quests.
  A "Mom" Villager comes with 5 "Culinary" Skill and 5 "Family" Skill, meaning it can get special drops from the Family and Culinary (though of a lesser quality, generally, than the Baker) mini-games and undertake quests from both skills.
  A "Street Acrobat" Villager comes with 5 "Performer", 3 "Social", and 2 "Exercise," meaning it can get special drops from all three Skill mini-games and undertake quests from all three.

Each "Open" villager registered can be competent in up to m (e.g., 1) skills. Unlike skilled-based villagers, open villagers may have a maximum aptitude less than that of a skilled villager in a single skill.

Skills have buildings associated with them that are used to gain access to the skill-related play activity and quests amongst other things. Each skill is tied to a single building; for example, the "Culinary" skill would be tied to a bakery, restaurant, or cooking school/kitchen building. Generally speaking, the higher level of skill a given villager has, the greater the caliber of item she will receive from a quest. Therefore, a Baker with a level 10 (the highest) Culinary skill are far more likely to get the rarest and most high-quality Culinary item than a Mother whose Culinary skill is half that of the Baker.

In addition to offering play activity and quests, the skill buildings also provide players with access to Crafting. A single skill building can accommodate all of a player's villagers that have competency in its skill.

Figure 1:
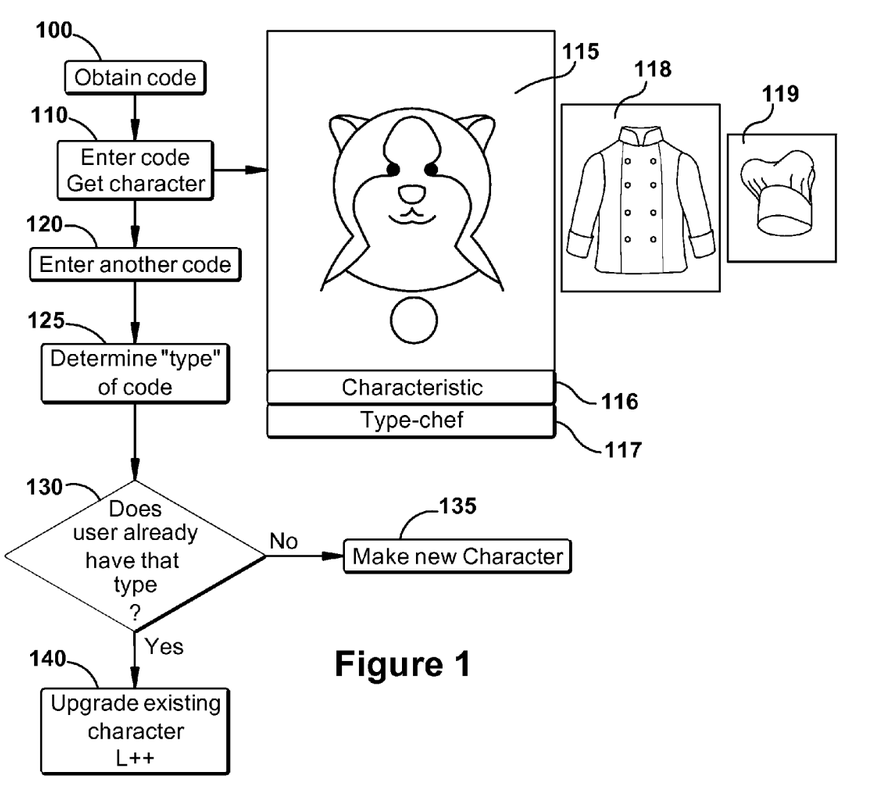
FIG. 1 shows a flowchart of operation of the villager upgrading.

Turning now to the figures, FIG. 1 shows obtaining a code at 100, and using the code at 110 to obtain access to a virtual representation of the villager in the virtual world (shown as 115). As explained above, the code sets the various characteristics in the default villager, which is shown as a characteristic set 116. As part of the characteristic set 116, there is also a type 117 to the villager. Here, the villager is a Chef type.

After entering the first villager's code, at 120, another code is entered. 125 represents determining the villager type associated with this code. 130 then determines if this is the first time that the player has purchased this (villager) type of figurine (in this case, a Chef). If this is the first time that the player has entered that type of code, then a new villager (in the form of another virtual representation) is created at 135. Here, however, if the code is of type "Chef", the existing villager is upgraded at 140. According to one embodiment, the villager is only upgraded by the entered code if the villager type already exists in the player's account, rather than the player getting a new virtual representation of that villager. Therefore, the player is provided with a new villager (by way of a virtual representation of the figurine) from the code if no villager of that type currently exists in the player's account; as contrasted by the player just receiving an upgrade to her existing virtual villager from the (second entered) code if a villager of that type does exist in her account.

To illustrate the villager type upgrade as described above, imagine that a virtual representation of a basic, level 1 Chef Villager is given to the player upon initial registration. A Base Chef Outfit 118 and a Base Chef Hat 119 is given to the villager. Special Items unique to the figurine purchased are given to the villager. The player may also have other options. For example, the player can choose among the fur options the outfits for the Chef Villager.

The Chef Villager can be added to a Village and a restaurant can either be automatically added because of the chef, or can already exist in the village. This allows players in the village to interact with the Chef Villager. Other villagers (as controlled by their respective players) can enter the restaurant. The mini-game "Cook-Off!" and crafting games can now be played. In addition, upgrade options for the Villager Type purchased (chef type) are now available for purchase by the restaurant/Chef's owner/player.

The upgrade of the level of the Chef Villager at 140 occurs when the player enters at least a second code that relates to a villager type that has already been entered (at least once). As shown in 140, this raises the level of that villager by one. That is, if the villager is already at level I, then the villager's level is raised to level II. At this point, the system indicates to the player what rewards come with the upgrade (if any) and also displays information associated with the new level. For example, for the chef, the rewards may include a new cooking set, and the player is told that the chefs new level is level II. The chef may also obtain a new uniform for level II, and may have a different look and face associated with level II.

There may also be a cap set on the levels for each product type. For example, cooks may max out at level X. After the Villager has reached the level cap, the player may still receive rewards for entering new codes, but does not get additional level increases (since there are no increases in levels beyond the cap level). Alternatively, there can be a cap set to the number of level increases that can occur via entering and registering new codes of the same villager type. For example, a villager may be limited to 3 level increases as a result of registering additional figurines of the same type as a previously registered figurine.

Figure 2:
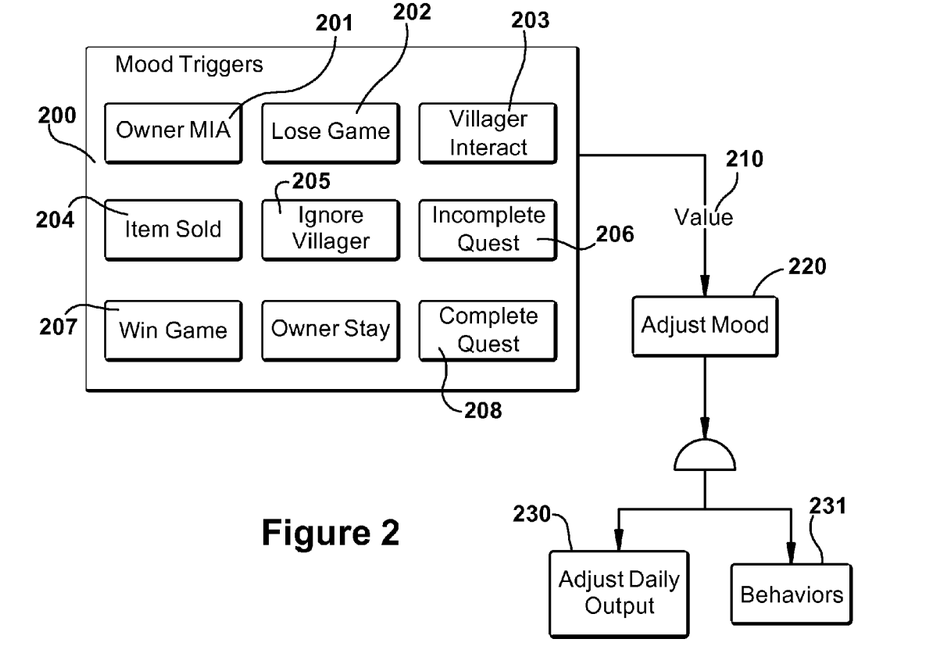
FIG. 2 shows a flowchart of mood adjustment.

As the villagers interact within the game, their moods may be changed according to the different way in which the game is ongoing. FIG. 2 illustrates mood output changes.

According to an embodiment, there are many different mood triggers shown generally as 200. Any of these triggers produce an output mood value 210. The mood value 200 causes the mood of different players to be adjusted in different ways at 220. The adjustment may include adjusting the daily output of the players at 230 and adjusting their behaviors at 231.

Some of the mood triggers generate negative values while other mood triggers generate positive values. For example, a positive value may cheer up the villager, while a negative value may upset or sadden the villager.

According to one embodiment, one of the triggers which adjust the mood is when the owner/player has become missing in action ("MIA"), shown as 201 in FIG. 2. A player becomes MIA when the player has not logged in for 5 days or more. This may result in a negative change of the mood of all of the player's villagers.

Another negative mood trigger at 202 occurs when a player loses a game. For example this may only occur when the game is lost significantly, e.g. gotten a failing grade (F) in a game. This again may adjust the mood negatively of all or some of the player's villagers.

203 shows villager interaction, in which the player interacts with the villagers. Alternatively, the villager can be interacted with by another villager such as a clown. This can adjust the mood of the villagers in a positive manner.

At 204, an item-being-sold trigger is shown. This can also adjust the mood (positively) of the villager who made the purchase.

An ignore trigger is shown at 205, whereby the villager is not interacted with by the owner/player, even though the player has been around (logged in). Activating the ignore trigger can negatively affect the mood of that player's villagers.

At 206, the player has accepted a quest from one of his villagers, but has not completed it. This can also negatively impact the mood of the quest-holding villager.

207 may be the opposite of 202, where a player has won a mini-game e.g. not gotten an F. This can result in a positive effect of the mood of the villager who represented the player in the mini-game.

208 represents the player who has accepted and completed a quest from one of his villagers. This can adjust the mood (positively) of that quest-holding villager.

When any of the mood triggers have been activated, a mood value is created by that adjustment. The mood value can be positive or negative. The adjustment at 220 comprises adding the mood value created by the trigger to the villager's existing mood value. This alters the mood of the villager or villagers and may change the way the villager reacts in the virtual world.

According to one embodiment shown in 230, each of the affected villager's daily output value may vary according to the rules governing how mood affects output. Another embodiment shown in 231 causes the villagers to have specific behaviors that are mood-dependant, which will affect what the villager does in the village.

An example of mood output will be explained for the case of trigger 201 where the owner/player is MIA. In this embodiment, the player is considered to be MIA when the player has not logged in for 5 consecutive days or more. The system calculates how many days the player has been MIA by calculating the difference between the current date and the last date logged in.

This is then used to calculate how much to subtract from the affected villager's current mood value. According to an embodiment, the system multiplies (−2) to the number of MIA days and subtracts the result from the villager's mood value to get a result. This may be conditional; that is the villager's total mood value may be limited to a value of 100. In the conditional case, if the villager's mood value is −100 then do not do anything. If the calculated value is less than (−100) then the value is limited to (−100).

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example many other different kinds of traders can be used to change the mood. Also, while the upgrading described herein increases the level of the villager, it may also cause the villager's appearance to change, for example level to cook me look older and wiser than the level I cook.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, display port, or any other form.

When operated on a computer, the computer may include a processor that operates to accept user commands, execute instructions and produce output based on those instructions. The processor is preferably connected to a communication bus. The communication bus may include a data channel for facilitating information transfer between storage and other peripheral components of the computer system. The communication bus further may provide a set of signals used for communication with the processor, including a data bus, address bus, and/or control bus.

The communication bus may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or any old or new standard promulgated by the Institute of Electrical and Electronics Engineers ("IEEE") including IEEE 488 general-purpose interface bus ("GPIB"), and the like.

A computer system used according to the present application preferably includes a main memory and may also include a secondary memory. The main memory provides storage of instructions and data for programs executing on the processor. The main memory is typically semiconductor-based memory su.ch as dynamic random access memory ("DRAM") and/or static random access memory ("SRAM"). The secondary memory may optionally include a hard disk drive and/or a solid state memory and/or removable storage drive for example an external hard drive, thumb drive, a digital versatile disc ("DVD") drive, etc.

At least one possible storage medium is preferably a computer readable medium having stored thereon computer executable code (i.e., software) and/or data thereon in a non-transitory form. The computer software or data stored on the removable storage medium is read into the computer system as electrical communication signals.

The computer system may also include a communication interface. The communication interface allows' software and data to be transferred between computer system and external devices (e.g. printers), networks, or information sources. For example, computer software or executable code may be transferred to the computer to allow the computer to carry out the functions and operations described herein. The computer system can be a network-connected server with a communication interface. The communication interface may be a wired network card, or a Wireless, e.g., Wi-Fi network card.

Software and data transferred via the communication interface are generally in the form of electrical communication signals.

Computer executable code (i.e., computer programs or software) are stored in the memory and/or received via communication interface and executed as received. The code can be compiled code or interpreted code or website code, or any other kind of code.

A "computer readable medium" can be any media used to provide computer executable code (e.g., software and computer programs and website pages), e.g., hard drive, USB drive or other. The software, when executed by the processor, preferably causes the processor to perform the inventive features and functions previously described herein.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of interacting with characters in a virtual world, comprising: receiving a code by a server computer system over a network connection from a user;
   responsive to receiving said code, registering a first virtual character of a first type by the server computer system, and providing a virtual representation of the first character directed to the user over the network connection;
   allowing interaction with the virtual representation of the first character by the user, said interacting including at least changing at least one item that is worn by the first character and carrying out at least one virtual task;
   initially assigning a level to the first character as being a first level, where said level represents a level of skill of the first character in carrying out said at least one virtual task;
   receiving a second code by the server computer system over the network connection from the user;
   analyzing the second code by the server computer system to determine if the second code represents a second character of said first type; and
   if the second code represents that said second character is of said first type, then the server computer system increases said level of the first character to a second level based on said entering said second code, where said second level has additional capabilities in carrying out said at least one virtual task as compared with said first level, and if the second code represents that said second character is not of said first type, then the server computer system registers said second virtual character of a second type to the user and provides a virtual representation of the second character to the user over the network connection.

2. A method as in claim 1, wherein said first and second levels of said first character have different appearances in the virtual world.

3. A method as in claim 1, wherein said first and second levels of said first character have different specific skills in the virtual world.

4. A method as in claim 1, wherein said first skill includes a vocation of the characters.

5. A method as in claim 4, wherein said first type of character is a cook, and said second type of character is a vocation other than a cook.

6. A method as in claim 1, wherein when the second code represents that said second character is of said first type, then the server computer system increases said level of the first character to said second level based on said entering said second code without providing a virtual representation of said second character associated with said second code, and when the second code represents that said second character is not of said first type, then the server computer system registers said second virtual character of the second type to the user and provides a virtual representation of the second character to the user over the network connection.

7. A method as in claim 1, setting a mood value for the character in the virtual world.

8. A method as in claim 7, wherein the first character reacts to actions in the virtual world according to the mood value, where one mood of the first character represented by one mood value causes the first character to react differently than another mood value representing another mood of the first character; and where an action or inaction taken by the user in the virtual world changes the mood value of the first character based on said action or inaction.

9. A method of interacting with characters in a virtual world, comprising: receiving a code by a server computer system over a network connection from a user;
responsive to receiving said code, registering a first virtual character of a first type by the server computer system, and providing a virtual representation of the first character directed to the user over the network connection;
allowing interaction with the virtual representation of the first character by the user by carrying out at least one virtual task using said first character;
initially carrying out said at least one virtual task using said first character at a first skill level;
receiving a second code by the server computer system over the network connection from the user;
analyzing the second code by the server computer system to determine if the second code represents a second character of said first type; and
if the second code represents that said second character is of said first type, then the server computer system increases said first skill level of the first character to a second level based on said entering said second code without registering said second character from said second code.

10. A method as in claim 9, wherein when the second code represents that said second character is not of said first type, then the server computer system registers said second character of the second type to the user and provides a virtual representation of the second character to the user over the network connection.

11. A method of interacting with characters in a virtual world, comprising:
interacting with a first virtual character of a first type, and providing a virtual representation of the first character to a user by a server computer system over a network connection;
setting a mood value for the character in the virtual world by the server computer system;
the character reacting, to actions in the virtual world according to the mood value, where one mood of the character represented by one mood value causes the character to react differently than another mood value representing another mood of the character;
allowing interaction with the virtual representation of the first character by the user; and
detecting an action or inaction in the virtual world by the server computer system and changing the mood value of the character based on said action or inaction, wherein said action or inaction comprises both of the user having logged into the website and also not having interacted with the character.

12. A method of interacting with characters in a virtual world, comprising:
interacting with a first virtual character of a first type, and providing a virtual representation of the first character to a user by a server computer system over a network connection;
setting a mood value for the character in the virtual world by the server computer system;
the character reacting to actions in the virtual world according to the mood value, where one mood of the character represented by one mood value causes the character to react differently than another mood value representing another mood of the character;
allowing interaction with the virtual representation of the first character by the user; and
detecting an action or inaction in the virtual world by the server computer system and changing the mood value of the character based on said action or inaction, wherein said action or inaction is an action in which the user loses a game in the virtual world.

13. A method as in claim 12, wherein said user owns a plurality of different characters and said mood value is applied to each of said plurality of characters.

14. A method as in claim 11, further comprising receiving a code by the server computer system over a network connection from a user; and responsive to receiving said code, the server computer system registering said first virtual character.

* * * * *

UNITED STATES PATENT AND TRADEMARK OFFICE
CERTIFICATE OF CORRECTION

PATENT NO. : 8,323,068 B2
APPLICATION NO. : 13/091441
DATED : December 4, 2012
INVENTOR(S) : Joseph Benjamin Ganetakos et al.

Page 1 of 1

It is certified that error appears in the above-identified patent and that said Letters Patent is hereby corrected as shown below:

Column 2, line 44, the word "nm" should read --run--.

Column 8, line 30, the word "su.ch" should read --such--.

Signed and Sealed this
Fifth Day of February, 2013

Teresa Stanek Rea
*Acting Director of the United States Patent and Trademark Office*